United States Patent
Dalessio et al.

(10) Patent No.: US 10,747,852 B1
(45) Date of Patent: Aug. 18, 2020

(54) LICENSE COMPLIANCE ANALYSIS PLATFORM

(71) Applicant: Pivotal Software, Inc., San Francisco, CA (US)

(72) Inventors: Michael Dalessio, Madison, NJ (US); David Schachner, Livermore, CA (US); Cyrus Phiroze Wadia, Larkspur, CA (US); Kim Rubric Dykeman, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 172 days.

(21) Appl. No.: 15/811,448

(22) Filed: Nov. 13, 2017

(51) Int. Cl.
| | |
|---|---|
| *G06F 21/00* | (2013.01) |
| *G06F 21/10* | (2013.01) |
| *G06F 8/71* | (2018.01) |
| *G06Q 50/18* | (2012.01) |
| *G06F 3/0482* | (2013.01) |
| *G06F 8/65* | (2018.01) |

(52) U.S. Cl.
CPC .......... *G06F 21/105* (2013.01); *G06F 3/0482* (2013.01); *G06F 8/65* (2013.01); *G06F 8/71* (2013.01); *G06F 21/10* (2013.01); *G06Q 50/184* (2013.01)

(58) Field of Classification Search
CPC ........ G06F 21/10; G06F 21/105; G06F 21/12; G06F 21/121; G06F 21/16; G06F 21/125; G06F 21/44; G06F 21/445; G06F 21/50; G06F 21/51
See application file for complete search history.

(56) References Cited

U.S. PATENT DOCUMENTS

| | | | | |
|---|---|---|---|---|
| 2006/0242077 A1* | 10/2006 | Dettinger | ................. | G06F 21/12 705/59 |
| 2008/0209393 A1* | 8/2008 | Evensen | ................... | G06F 8/43 717/108 |
| 2010/0241469 A1* | 9/2010 | Weigert | ................... | G06F 8/75 717/124 |

* cited by examiner

*Primary Examiner* — Edward Zee
(74) *Attorney, Agent, or Firm* — Fish & Richardson P.C.

(57) ABSTRACT

Methods, systems, and computer-readable media for managing license compliance in software development. A license analyzer receives a triggering event for analyzing license obligations associated with a software package. In response, the license analyzer performs a first scan on dependencies in the software package to determine libraries included in the software package and declared licenses in the included libraries. The license analyzer performs a second scan on source files in the software package to detect, based on license indicators present in the source files, licenses implicitly used in the software package. The license analyzer generates a compliance document specifying the license obligations based on results of the scans.

20 Claims, 7 Drawing Sheets

| Scanning Project A | | | | | |
|---|---|---|---|---|---|
| Software Package Name | Software Package Version | Unseen Licenses | Conflicting Licenses | Verified Licenses | Licenses Need Attention |
| first_pkg | 1.0 | 1 | 2 | 3 | 2 |
| second_pkg | 1.5.4 | 2 | 2 | 8 | 4 |

FIG. 4

LICENSE COMPLIANCE ANALYSIS PLATFORM

BACKGROUND

This specification generally relates to software release management.

Managing license obligations across the myriad of components being leveraged in modern software development can be a complex process. Some development processes involve continuous integration/continuous distribution ("CI/CD"), where developers merge working copies to a shared mainline frequently, and push updates constantly at a rapid pace. A large application program may use thousands of libraries or other third-party copyrighted material. For example, some libraries may be open source software ("OSS") libraries governed by one or more of many OSS licenses while others are proprietary. Libraries may be inter-dependent and each can have their own dependencies.

Conventionally, license compliance requires close involvement of product managers (PMs) of individual product, engineering, and legal teams. Such tasks usually require a complete assessment of a release's dependencies, and therefore typically are performed just before major releases, after development has finished or almost finished. The tasks can be time consuming, requiring a company to lock the software for weeks or months for legal review to complete before any given release. The conventional license compliance process may not be possible where software pushes occur frequently as in CI/CD. A small change in the push that adds or removes a few lines of code may add or remove multiple branches in a dependency tree, requiring the entire license compliance analysis to be performed anew.

SUMMARY

This specification describes methods, systems, and computer-readable media for managing license compliance in software development. A license analyzer receives as input a prospective software release including a new software package or an update to one or more software packages used in a previous release. In response to the input, the license analyzer performs a first scan on software units included in, used by, or distributed with each of the software packages to discover and identify names and versions of all libraries included in the software package. The license analyzer further determines declared licenses for each of the included libraries. The license analyzer performs a second scan on source files within the software package to detect, based on license indicators present in the source files, licenses implicitly contained inside the software package. The license analyzer determines, by comparing the declared licenses and the detected licenses, an initial list of verified licenses and a second list of suspected conflicting or missing licenses. Each verified license includes a declared license that is verified by a detected license. Each suspected conflicting license includes a declared license that conflicts with a detected license. Once conflicting licenses are resolved, the license analyzer generates a compliance document based on the requirements of the verified and resolved licenses for the prospective software release.

Particular embodiments of the subject matter described in this specification can be implemented to realize one or more of the following advantages. The disclosed techniques reduces close involvement of product managers of individual product teams. Before releasing software, the disclosed techniques reduce cost of coordination between legal staff, product management staff, and engineering teams as required in conventional techniques. This is because coordination that is based on conventional techniques, such as manual license information updates or manual-entry ticketing systems, are resource intensive and require significant lead time prior to a given release date, whereas the disclosed techniques can perform compliance analysis automatically and in some cases, almost instantaneously. Accordingly, the disclosed techniques improve upon the conventional manual legal compliance analysis methods for software products by reducing lead time.

Conventional legal compliance analysis is not sufficient for modern software development. In conventional legal compliance analysis, information concerning dependencies and associated license data is passed between teams for manual updates, reviews and approvals. Frequently, discussions and negotiations around compliance occur long after a questionable dependency may have been included, making it extremely difficult or, in many cases, humanly impossible to achieve legal compliance at the pace with which modern software development occurs, particularly when the software being released includes multiple, e.g., thousands of, component versions of software units each being under one or more licenses and copyright obligations. Accordingly, compliance review can become a bottleneck that blocks the software from being released to customers, clients, communities and other end users. The disclosed techniques improve over the conventional approach to compliance analysis by inserting rapid automation and analyses to thereby remove this bottleneck.

Compared to conventional license analysis techniques, the disclosed techniques improve accuracy of license compliance analysis by reducing possibility of human error. When information is passed between humans, human errors may occur. The human errors can result in omissions in license notices, causing future legal issues, or insertion of erroneous license terms, unnecessarily burdening a software product or confusing a customer. By reducing such errors, the disclosed techniques improve quality of the software product.

In CI/CD, library dependency changes can occur rapidly in a software package. The disclosed techniques improve upon conventional compliance analysis, wherein discovery of changes is triggered manually via a bulk review of all software units, by detecting and confirming license dependencies and license compliance directly from the software package in real time as they occur based upon actions taken by engineering teams. In addition, reading code to determine library and license usage based on indicators is not a task suitable for manual implementation by humans given its time-consuming and error-prone nature. Accordingly, in many situations, conventional legal compliance analysis techniques are usually not suitable within today's modern CI/CD processes, resulting in imperfect compliance upon software distribution. The disclosed techniques can handle such situations effectively.

The disclosed techniques can reduce delays in a release cycle. Conventional legal compliance is usually provided at or near the end of a release cycle, when the code base is stable. At such time, compliance analysis may be the only hurdle before the final release. If the code base and compliance analysis are complex, the release date may be jeopardized, particularly when concerns requiring remediation are discovered late in the release cycle. The disclosed techniques speed up the compliance review, thus providing for tighter feedback loops between the various teams concerned with compliance and reducing chances of product release delay.

In some cases, a new release does not change license obligations in the software. The disclosed techniques can determine that the new release is legally equivalent to a previous release. In such cases, the system can automatically propagate all license obligations in the previous release to the new release and provide necessary legal approvals accordingly. The automatic propagation can result in lower overhead for a legal review team.

The details of one or more embodiments of the subject matter described in this specification are set forth in the accompanying drawings and the description below. Other features, aspects and advantages of the subject matter will become apparent from the description, the drawings and the claims.

BRIEF DESCRIPTIONS OF DRAWINGS

FIG. 4 is a summary view of an example dashboard user interface of a license analyzer.

Like reference numbers and designations in the various drawings indicate like elements.

DETAILED DESCRIPTION

Figure 1:
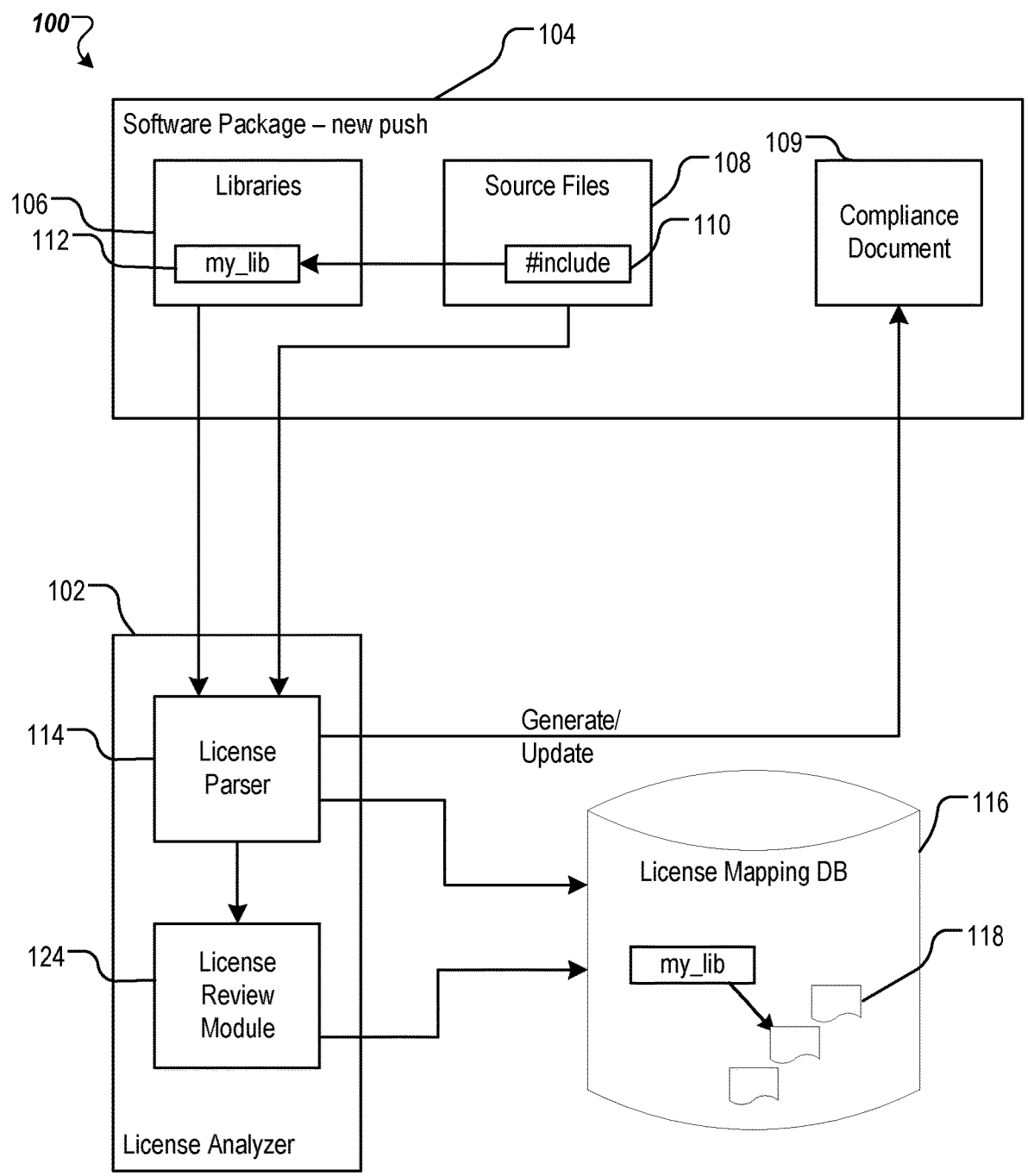
FIG. 1 is a block diagram illustrating example techniques of license compliance analysis.

FIG. 1 is a block diagram illustrating example techniques of license compliance analysis. The license compliance analysis is performed by a license analyzer 102 that includes one or more computer processors. In some implementations, the license analyzer 102 can be implemented on one or more servers in a cloud computing platform. The license analyzer 102 can perform the license compliance analysis on a software package 104 upon request, on a pre-defined time schedule or automatically in response to an update to the software package 104. The license analyzer 102 can perform the license compliance analysis on a new software package, or on a new release of an existing software package. In this specification, a release generally refers to a version of a software package. The license analyzer 102 can include a frontend portal, an application programming interface (API), and one or more databases.

In the example shown, the license analyzer 102 receives an update of the software package 104. The software package 104, also referred to as an application package, can include one or more components such as libraries 106 and source files 108. The libraries 106 generally include binary executable code. The source files 108 generally include text files such as source code of programs, one or more configuration files, makefiles, one or more documentation files, e.g., readme files, and other files. The package 104 may include a compliance document 109. The compliance document 109 includes one or more files describing license compliance requirements of the software package 104. For example, the compliance document 109 can include a copyright notice or license terms. The software package 104 is under development during all hours of the day, with updates constantly being introduced by developers and release engineers through code pushes. Any update can include the introduction of new code or libraries, modification of existing code or libraries, or deletion of files or libraries.

The libraries 106 can be included in the software package 104 explicitly or implicitly. An example of an explicit inclusion is a library specified in a source file, e.g., in a # include statement. An example of an implicit inclusion is a library being placed in a library path and, although not explicitly included, is dynamically called upon and used by another library in the software package 104. Each library may be associated with a license, e.g., an OSS license. The software package 104 must be compliant with all licenses under which its libraries are distributed. In addition, the software package 104 may include copyrighted material, e.g., images or source files. The copyrights need to be duly acknowledged. In this specification, unless specifically stated, the term "license" can refer to both a software use license such as an OSS license or a copyright notice.

In the example shown, in the update, a change in a particular source file added a new explicit inclusion 110, which caused a new library 112 "my_lib" to be included in the software package. A product manager may keep track of the new library 112 for license compliance. However, the product manager may not know all the libraries that the library "my_lib" additionally implicitly includes, the hierarchy and dependencies of the implicitly included libraries, the licenses of these implicitly included libraries, or whether the licenses have conflict with licenses of other libraries in the software package 104.

The license analyzer 102, in response to detecting the update, can perform a full license scan or a partial license scan on the software package 104. In some implementations, a configuration file can specify that a push operation pushing the update shall automatically trigger a license scan. In some implementations, the license analyzer 102 performs a license scan on a configurable schedule, and detects the update in the scan. In some implementations, a user input, e.g., a command line input, that specifies that the software package 104 is updated and shall be scanned, can trigger a license scan. In some implementations, the license scan can be a scheduled event that occurs periodically, e.g., every night or every week.

The update may be associated with a list of items, including libraries 106, source files 108 or both, that changed. Alternatively or additionally, the license analyzer 102 may include one or more tools that detects which component in the software package 104 changed. In a full license scan, the license analyzer 102 reviews all licenses of the software package 104. In a partial license scan, the license analyzer 102 reviews only licenses associated with those changed components.

In some implementations, an administrator can set up a monitoring pipeline using a continuous integration tool, e.g., Concourse developed by Pivotal Software, Inc. The pipeline can observe changes in a code repository of multiple software packages. Every time the tool detects a code change, the tool can initiate the operations of the license analyzer 102. In response, the license analyzer 102 performs a license scan and submits resulting list of dependencies and licenses for later processing. These early-and-often implementations have the advantage of reducing the burden of product teams and license review teams, as well as flagging problematic issues almost instantaneously instead of late in the development process when remediation is likely to be more costly.

The license analyzer 102 includes a license parser 114. The license parser 114 is a component of the license analyzer 102 configured to parse various files, including libraries 106, source files 108, and other files such as the existing compliance document 109 to determine licenses associated with the software package 104. The license parser 114 can determine the licenses in various ways. Generally, the license parser 114 can identify license indicators, e.g., names of licenses, from text files, or using a dual parsing process. Additional details on the dual parsing process are provided below in reference to FIG. 2.

The license parser 114 can identify licenses associated with a particular library using a license-mapping database 116. The license-mapping database 116 can store mappings between libraries and licenses. For example, the license-mapping database 116 can store a mapping between a particular version of the library 112 "my_lib" to licenses 118. The licenses 118 can include a license for the library 112 "my_lib" and one or more licenses for libraries that the library 112 "my_lib" depends from. In addition to the mappings, the license mapping database 116 may store text of the licenses or references, e.g., links, to the licenses.

The license analyzer 102 can generate an updated compliance document 109. The updated compliance document 109 can include terms that are added for the library 112 "my_lib" due to additional license requirements for the library 112 "my_lib" that was not included in the original compliance document. The additional license requirements can include, for example, additional terms of distribution, commercial use, attribution, copyright notice, and so on. The license parser 114 can extract these terms from the licenses stored in the license mapping database 116 or from a license repository hosted by a third party. In the example shown, the license analyzer 102 pushes the updated compliance document 109 into the software package 104. In various implementations, the license analyzer 102 can generate the updated compliance document 109 as one or more stand-alone files and distribute the updated compliance document 109 to various information consumers, e.g., quality assurance teams, license review teams or distribution endpoints.

The license analyzer 102 can include a license review module 124. The license review module 124 is a component of the license analyzer configured to provide license information on the software package for review through a user interface. The license review module 124 can provide for display a dependency tree of files and libraries used in the software package, a respective license identifier associated with each file or library, and content of the license if the license identifier is selected. The license review module 124 can emphasize those licenses that may be in conflict with other licenses.

The license review module 124 can accept user input from the user interface to edit terms in the compliance document 109 generated by the license parser 114 before the updated compliance document 109 to the software package 104 is generated. Thus, an update in a source file 108 triggers the license analyzer 102 to create or revise a compliance document 109, in the software package 104 or as one or more standalone files. In addition, the license review module 124 can accept user input to add or remove licenses associated with a library, and store the addition or removal from the license mapping database 116. Additional details on the user interface provided by the license review module 124 are described below in reference to FIGS. 3-6.

Figure 2:
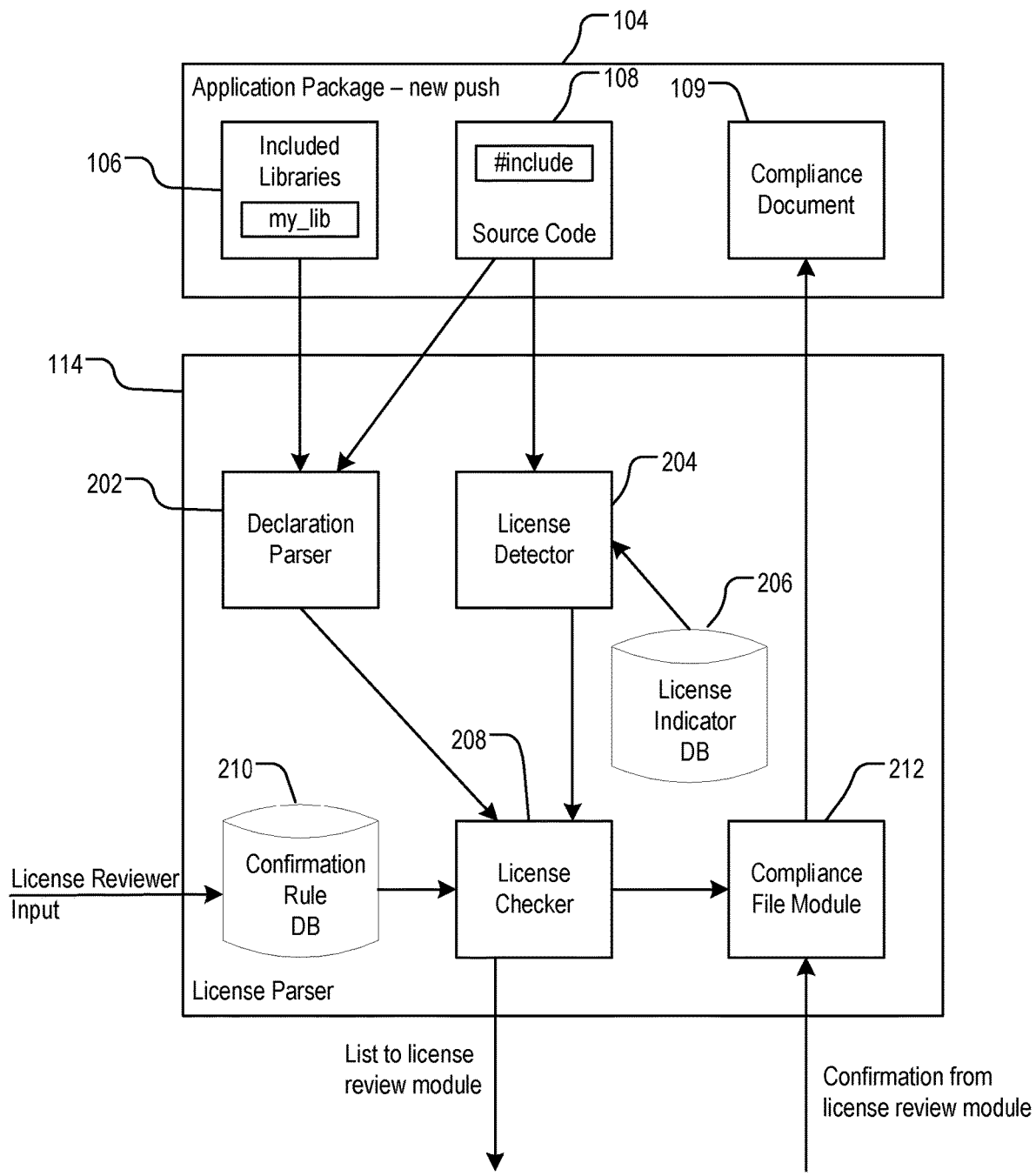
FIG. 2 is a block diagram illustrating example techniques of license compliance analysis based on dual parsing.

FIG. 2 is a block diagram illustrating example techniques of license compliance analysis based on dual parsing. The dual parsing process can be performed by a license parser 114. The license parser 114 and each component of the license parser 114 can be implemented on one or more computer processors. The license parser 114 parses one or more libraries or source files in the software package 104.

The license parser 114 includes a declaration parser 202 and a license detector 204. The declaration parser 202 is a component of the license parser 114 configured to determine one or more declared licenses of the application. A declared license can be a license explicitly stated in a file, e.g., in a metadata file specific to a particular programming language's dependency package manager. The declaration parser 202 parses files in the software package 104 and determines a hierarchy of dependencies of the files by traversing all relevant dependency trees. The declaration parser 202 then parses the files and identifies each declared license, e.g., "Apache License 2.0," from the files. Additionally or alternatively, the declaration parser 202 can use tools in a package manager to output a set of declared licenses of the software package 102.

The license detector 204 is a component of the license parser 114 configured to determine one or more licenses that at least a portion of the software package 104 may be subject to. The license detector 204 may determine such licenses by parsing files, e.g., the source files 108, or particular portions of the libraries 106, in search for particular license indicators. The license indicators may be contained in copyright headers of the source files, within "readme" files, or in license files. A license indicator can be one or more terms that are predetermined to be related to a license, if appearing in a source file together. Example license indicators can include names before certain symbols, e.g., words before ™, ® or ©, known acronyms of licenses, words such as "copyright," or appearance of multiple words in a group that, while not strong indicators individually, may suggest a license if appearing together, such as "license," "licensor," "licensee," "terms and conditions," among others. A license indicator database 206 can store these terms for use by the license detector 204. The license indicator database 206 can be updated by users and license reviewers over time. In addition or alternatively, the license detector 202 can use programs that match individual source files against the license indicator. The licenses thus determined by the license detector 204 are referred to as detected licenses.

In some implementations, some components of the declaration parser 202 and the license detector 204 can be implemented using OSS tools such as License Finder developed by Pivotal Software, Inc., or FOSSology, a Linux Foundation project. The declaration parser 202 and the license detector 204 provide the declared licenses and the detected licenses to a license checker 208. The license checker 208 is a component of the license parser 114 configured to determine whether a declared license and a detected license are compatible and consistent with one another.

The license checker 208 can determine whether a declared license and a detected license are compatible with one another based on one or more confirmation rules stored in a confirmation rule database 210. Each confirmation rule can specify a particular combination of one or more declared licenses (referred to as A, B, C . . . below) and one or more detected licenses (referred to as X, Y, Z . . . below), and an action associated with that combination. The rule can mark the particular combination as required, as conflicting, as acceptable, or as needing review.

For example, a first confirmation rule can specify that for a particular detected license X, a declared license A is required. The license checker 208 acts on data according to this first confirmation rule as follows. The license checker 208, upon receiving a list of detected licenses from the license detector 204, determines if the list includes license X. If the license checker 208 finds license X in the list, the license checker 208 scans a list of declared licenses received from declaration parser 202 for license A.

If the license checker 208 finds license A, the license checker 208 can submit both license A and license X to a compliance file module 212. The compliance document file 212 can generate a compliance document 109, or update an existing compliance document 109, for the software package 104. Optionally, the license checker 208 provides lists of licenses including license A and license X to a license review module, e.g., the license review module 124 of FIG. 1, for review. If the license checker 208 does not find license A, the license checker marks the license X as lacking declaration, and provides the license A to the license review module flagged for review.

A second confirmation rule can specify that a particular declared license B conflicts with a particular detected license Y. The license checker 208 acts on data according to this second confirmation rule as follows. The license checker 208, upon receiving a list of detected licenses from the declaration parser 202, determines if the list includes license B. If the license checker 208 finds license B in the list, the license checker 208 scans a list of detected licenses received from license detector 204 for license Y.

If the license checker 208 does not find license Y, the license checker 208 can submit license B to the compliance file module 212. Optionally, the license checker 208 provides lists of licenses including license B a license review module for review. If the license checker 208 finds both license B and license Y, the license checker 208 marks the licenses B and Y as conflicting, and provides the conflicting licenses to the license review module flagged for review.

A third confirmation rule can specify that a combination of license C and license Z will require review by a license administrator. The license checker 208, upon receiving a list of detected licenses from the declaration parser 202, determines if the list includes license C. The license checker 208 scans a list of detected licenses received from license detector 204 for license Z. If the license checker 208 does not find license Z, the license checker 208 can submit license C to the compliance module 212. If the license checker 208 finds both license C and license Z, the license checker 208 marks the licenses C and Z as requiring review, and provides the licenses to the license review module for review.

Figure 3:
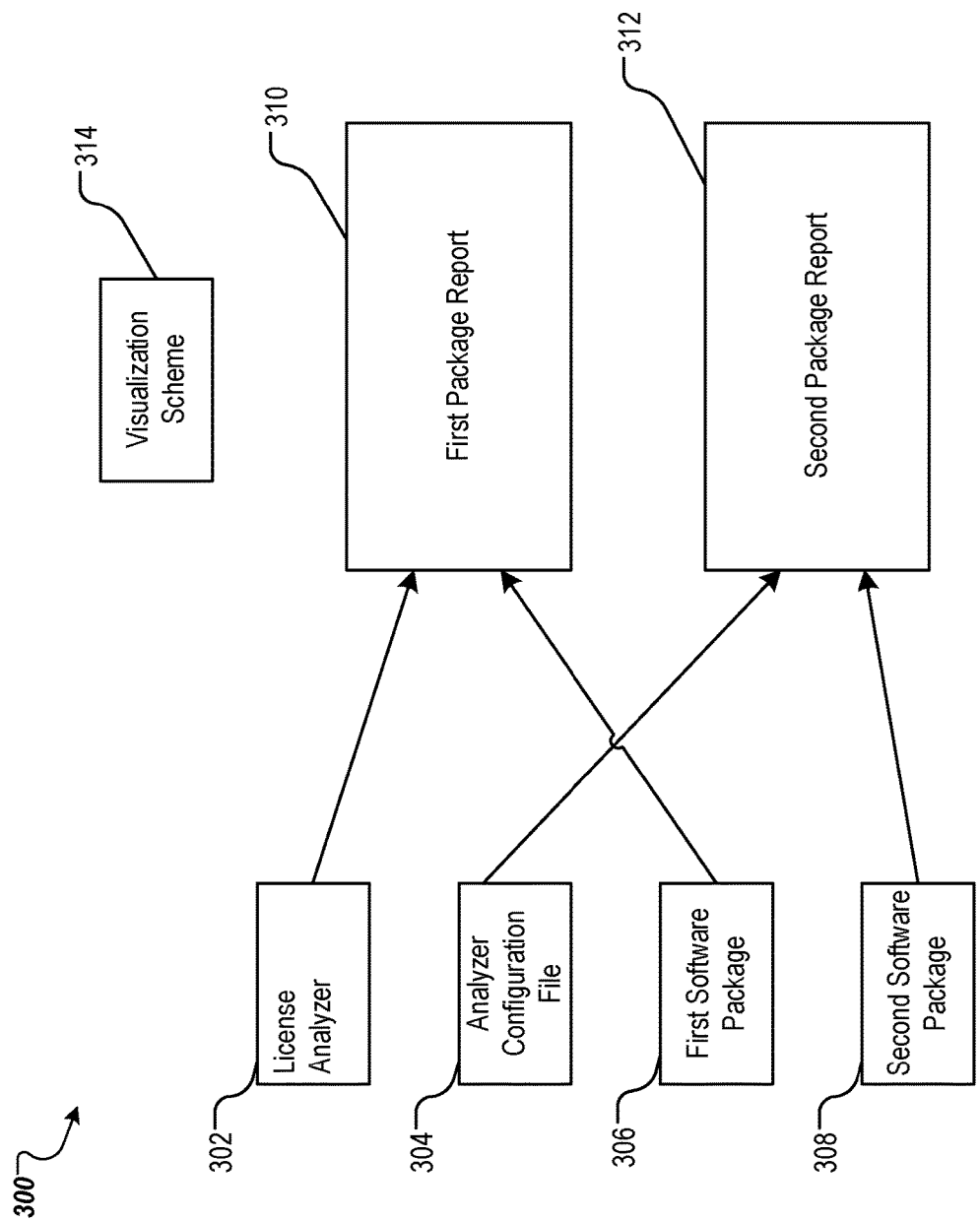
FIG. 3 illustrates an example visualization of operations of a license analyzer.

FIG. 3 illustrates an example visualization 300 of operations of a license analyzer. The license analyzer can be the license analyzer 102 of FIG. 1. The visualization 300 can be provided by the license review module 124 of FIG. 1. The visualization 300 can be displayed on a display device. The visualization 300 can include a first visual representation 302 representing the license analyzer and a second visual representation 304 representing a configuration file for the license analyzer.

The license analyzer can be scheduled to perform license scanning on one or more software packages, e.g., the software package 104 of FIG. 1, at specified time (e.g., 1 am every weekday) or at specific intervals (e.g., every X days or X hours). The configuration file, shown as the second visual representation 304, specifies details of each of the one or more software packages. Pseudo code of an example configuration file is shown below in Listing 1. In the example shown, the configuration file is a .yml file. The configuration file can have any suitable format.

```
releases:
    repo: <first sp path and name>
        blobs:
            name: <first library path and name>
            skip: true
            name_pattern: <second library path and name,
                including regex>
            repo: <second library path>
            ref: <second library version>
        repo: <second sp path and name>
            prepare command: <command to execute before
                license scan>
```

The configuration file specifies that the license analyzer shall perform license scans for two software packages under the "repo" tags. The software packages are named in the parameters <first sp path and name> and <second sp path and name>, respectively. The "blobs" section for the first software package can specify one or more components present in a software package. In the example shown, the configuration file specifies a first component in the parameter for the "name" tag, <first library path and name>. If the first library does not need to be scanned, the configuration file can have a "skip: true" setting that instructs the license analyzer to skip this particular library.

In the example shown, the configuration file specifies a second library in the parameter by using a "name_pattern" tag. The "name_pattern" tag can specify a library that has multiple versions that may evolve over time. The version number can be specified using a regular expression (regex), e.g., as (?<version>[\d\.]+) to indicate possible version numbers such as 1.1.2 or 2.5.7.13 and so on. The configuration file can have a "repo" tag for the second library, as specified in the <second library path> parameter. The configuration file can have a "ref" tag to specify a current version of the second component.

In the example shown, for the second software package, the configuration file has a "prepare command" tag that specifies one or more commands that the license analyzer shall execute before performing the license scan. The commands specified for this tag can include, for example, creating one or more temporary directories, executing a code push, executing a "make" command for the software package, and so on. This configuration file is represented as visual representation 304 of FIG. 3. In some implementations, the configuration file is generated or edited through a frontend portal of a license analyzer. For example, the frontend portal can include a browser-based interface for specifying a software release including a product name (e.g., my_product) and version number (e.g., 7.5). The interface can specify a scan root, e.g., a directory name, that corresponds to the release, from where the scan proceeds.

The visualization 300 can include a third visual representation 306 representing the first software package to be scanned, and a fourth visual representation 308 representing the second software package to be scanned. The visualization 300 can include a first report indicator 310 indicating result of scanning the first software package, and a second report indicator 312 indicating result of scanning the second software package. Arrows between items in the visualization 300 can indicate sources of information represented by the first report indicator 310 and the second report indicator 312.

The first report indicator 310 and the second report indicator 312 can follow a visualization scheme 314 to provide high-level information on the general status of the license scan. For example, the visualization scheme 314 can be a color scheme specifying that a first color, e.g., gray, indicates a current status of a report is pending; that a second color, e.g., yellow, indicates that a license scan has started; that a third color, e.g., green, indicates that a license scan has completed successfully; that a fourth color, e.g., red, indicates that a license scan has failed; that a fifth color, e.g., orange, indicates that an error occurred during a scan; that a sixth color, e.g., brown, indicates that a license scan is aborted; and that a seventh color, e.g., blue, indicates that a license scan is paused.

FIG. 4 is a summary view 400 of an example dashboard user interface of a license analyzer. The license analyzer can be the license analyzer 102 of FIG. 1. The dashboard can be provided by the license review module 124 of the license analyzer as shown in FIG. 1. The dashboard can include a collection of user interfaces that allow users including, for example, engineers, product managers, compliance experts, legal staff and administrators to view and manage licensed software units corresponding to a given software release. A software unit can be a library, an executable program or a source code file.

The summary view 400 can present a result of a scan project that includes license scans for one or more software packages. The result can be presented as a table view 402 that lists a respective name and version of each software package, and respective numbers of licenses that the license analyzer has not encountered before, numbers of conflicting licenses, numbers of verified licenses and numbers of licenses that need administrator review. Each of the names and numbers can be interactive. For example, a software package name "first_pkg" can be clickable. Upon receiving a user input clicking on the name, the license analyzer presents a detailed view of licenses of that software package.

Figure 5:
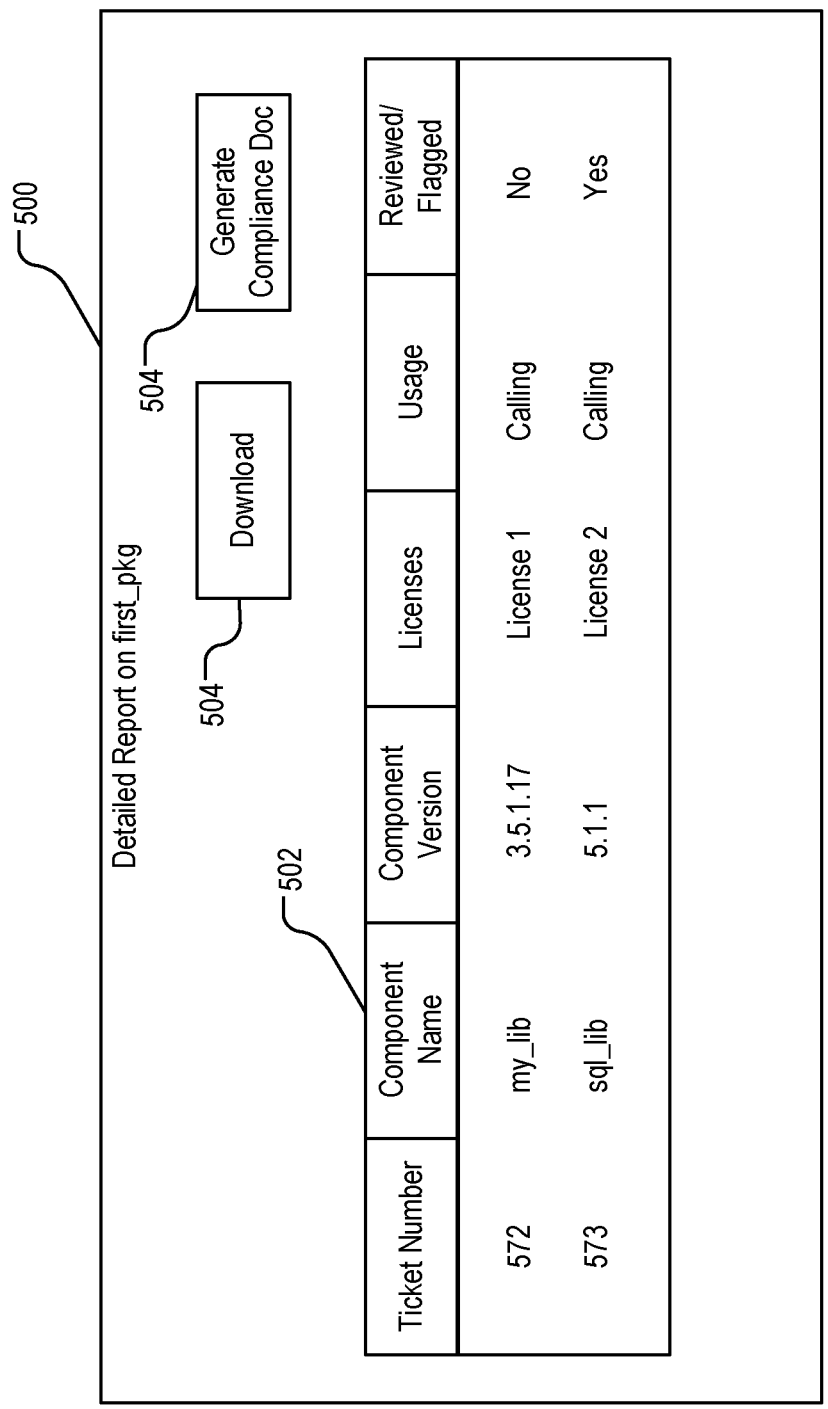
FIG. 5 is a detailed view of an example dashboard user interface of a license analyzer.

FIG. 5 is a detailed view 500 of an example dashboard user interface of a license analyzer. The license analyzer can present the detailed view 500 for display in response to a user selection from a list view of the dashboard. For example, the license analyzer can present the detailed view 500 in response to a user input selecting a software package "first_pkg" from the table view 402 of FIG. 4.

The detailed view 500 can include a table view 502 that lists components, e.g., libraries, of the software package. The license can assign a unique identifier, e.g., a ticket number, to each component, such that the component can be tracked. The table view 502 can have a component name field for showing names of the components, e.g., "my_lib" and "sql_lib," as well as a component version field for showing versions of the components. The table view 502 has a licenses field that shows the respective license or licenses scanned from each component. The table view 502 can have a usage field for displaying how each component is used in the software package. The table view 502 can have one or more status fields to indicate whether a particular component is reviewed, is flagged, or still needs review.

The detailed view 500 can include a user interface item, e.g., a download button 504, that is configured to receive a user input for downloading a report on the software package. In response to receiving the user input, the license analyzer can generate a license report that includes the information in the table view 502. The license report can be a comma separated values (CSV) file or a file in other user selected formats.

The detailed view 500 can include a user interface item, e.g., a generate document button 506, that is configured to receive a user input for generating a compliance document, e.g., the compliance document 109 of FIG. 1. In response to receiving the user input, the license analyzer can generate the compliance document and upload the compliance document to a repository of the software package.

Each entry in the table view 502 can be selectable. For example, the entry having ticket number 573 can receive a user selection, e.g., a click. In response to the user selection, the dashboard can present a drill-down view for editing and approving licenses for the corresponding component, e.g., library "my_lib," of the software package.

Figure 6:
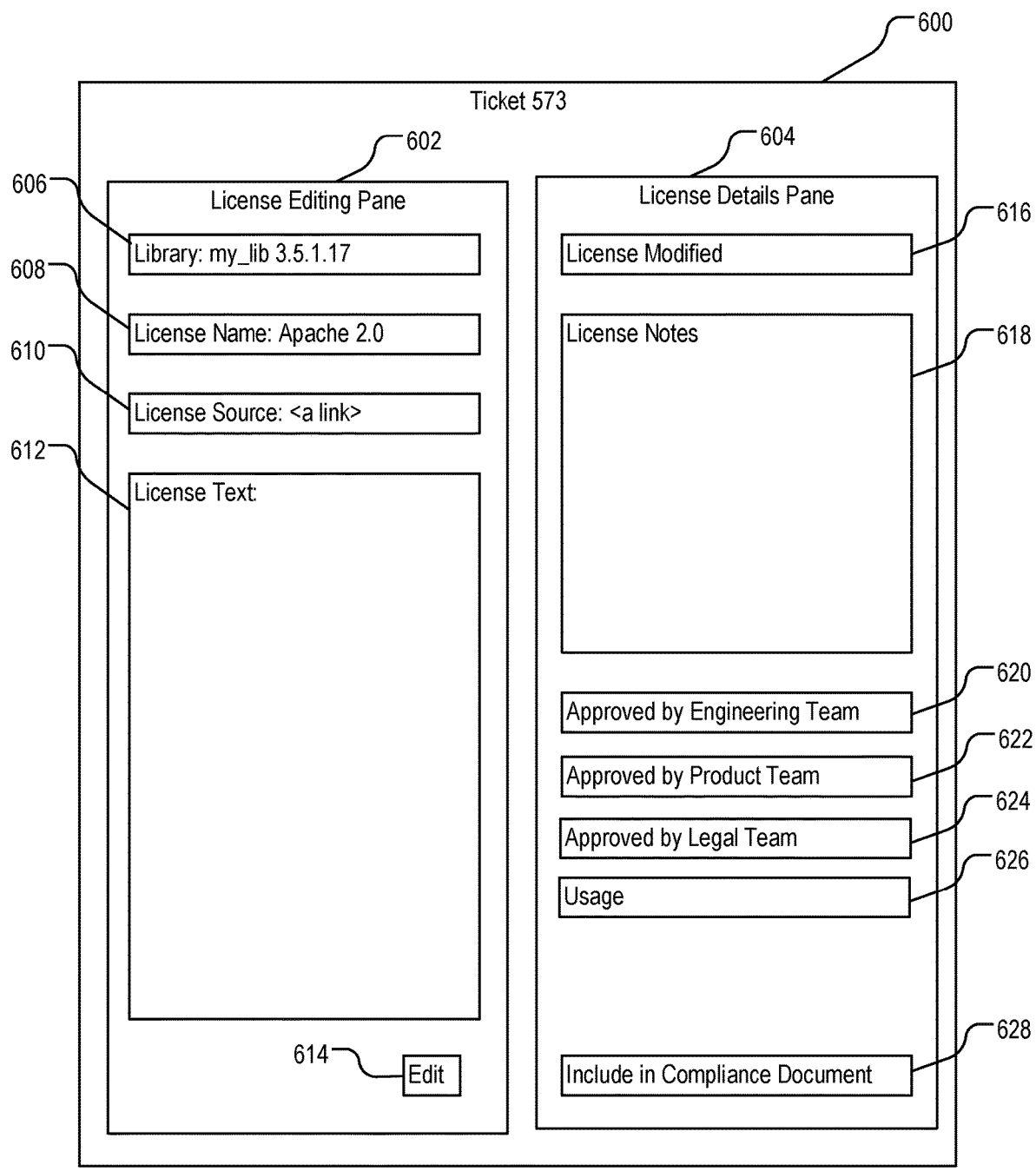
FIG. 6 is a drill-down view of an example dashboard user interface of a license analyzer.

FIG. 6 is a drill-down view 600 of an example dashboard user interface of a license analyzer. The license analyzer can display the drill-down view 600 upon receiving a user selection on ticket corresponding to a software component, e.g., ticket number 573. A ticket can be a single usage of a software unit on which legal, engineering, or management staff takes action.

The drill-down view 600 includes a license editing pane 602 and a license details pane 604. The license editing pane 602 is configured to present name, source and text of one or more licenses. The license editing pane 602 includes a library field configured to display a name and version of a library. The license editing pane 602 includes a license name field 608 displaying a name of a license associated with the library. In case a library is associated with multiple licenses, the license name field 608 can include a pull down menu listing all the licenses. The license editing pane 602 includes a license source field 610 displaying a name of a license. The source can be a link, e.g., a URL, that points to a repository of the license. The license editing pane 602 includes a license text field 612. The license text field 612 can display text of the license. For example, the license text field 612 can display text of a copyright notice in addition to text from the license itself. The license editing pane 602 can include an edit button 614. Upon receiving a user input on the edit button 614, the license analyzer can make the license text field 612 editable to allow a reviewer to change text of the license for use with the current software package in order to meet any and all compliance obligations associated with the license or licenses.

The license details pane 604 can include multiple fields for displaying metadata of the licenses of the component of the software package. The license details pane 604 includes a modification indicator 616 indicating whether one or more software units have been modified by the software package development team since modified software units can trigger additional compliance obligations under the OSS licenses. The license details pane 604 can include a license notes field 618 configured to display, and to receive user input to edit, textual notes on the license.

The license details pane 604 can include engineering team approval field 620 configured to indicate whether engineering team has approved the license. Upon determining that a user using the dashboard is a member of the engineering team, the license analyzer can make the engineering team approval field 620 editable to allow the user to approve or disapprove the license. The license details pane 604 can include product team approval field 622 configured to indicate whether product team has approved the license. Upon determining that a user using the dashboard is a member of the product team, the license analyzer can make the product team approval field 622 editable to allow the user to approve or disapprove the license. The license details pane 604 can include legal team approval field 624 configured to indicate whether legal team has approved the license. Upon determining that a user using the dashboard is a member of the legal team, the license analyzer can make the legal team approval field 624 editable to allow the user to approve or disapprove the license.

The license details pane can include a usage field 626. The usage field can indicate a usage of the component, e.g., whether the component is calling other components. The usage field 626 can be editable. The license details pane can include an inclusion selector 628 that is configured to receive a user input on whether to include terms of a particular license in a compliance document of the software package.

Figure 7:
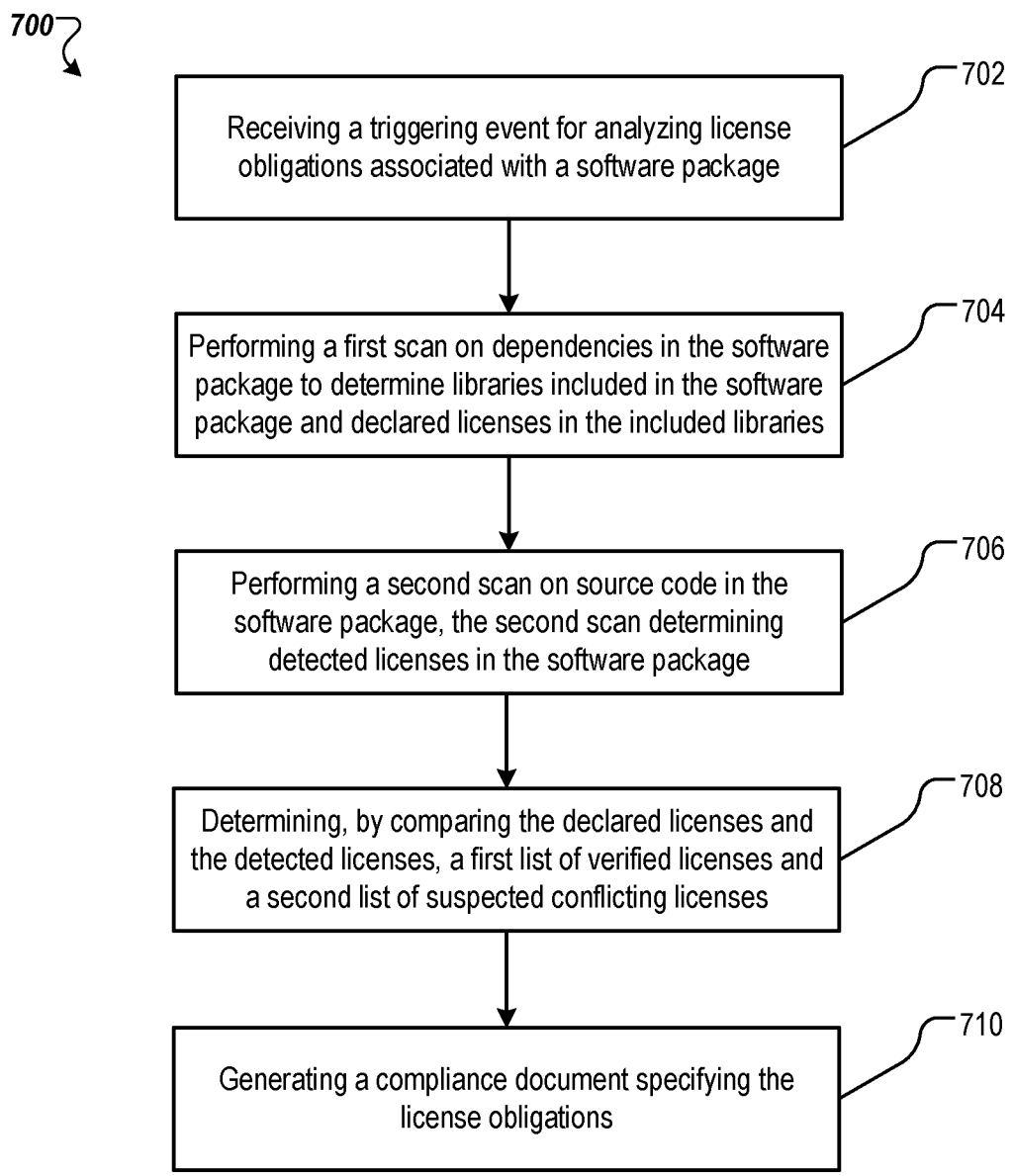
FIG. 7 is a flowchart illustrating an example process of license compliance analysis.

FIG. 7 is a flowchart illustrating an example process 700 of license compliance analysis. The process 700 can be performed by a system including one or more processors, e.g., the license analyzer 102 of FIG. 1.

The system receives (702) a triggering event for analyzing license obligations associated with a software package. The triggering event can include a user request, a scheduled event, or an update to the software package. Files of the software package, including libraries and source files, can be stored in a repository. A configuration file of the system specifies the location of the repository. The system can examine the repository using various version control tools to determine whether an update occurred and if yes, which file or files are updated.

In response to the update, the system performs (704) a first scan on dependencies in the software package. In the first scan, the system determines libraries explicitly or implicitly included in the software package. The system determines declared licenses in the included libraries. Each license can be a software use license or a copyright notice. The first scan can be a predictive scan based on declared licenses ordinarily included for package manager dependency management.

The system performs (706) a second scan on source files in the software package. In the second scan, the system determines, based on license indicators present in the code, detected licenses in the software package. The license indicators can include at least one of: one or more identifiers of licenses; or, terms that indicate that copyrighted material is used in the software package.

The system can perform the first scan and the second scan on the entire software package. In some implementations, the system can perform the first scan and the second scan incrementally according to the update. The update can be a code push in the software package where some files are changed. The system can perform the first scan and the second scan only based on changed portion of the software package. The system can perform the scans in real time and in association with the code push.

By comparing the declared licenses and the detected licenses, the system determines (708) a first list of verified licenses and a second list of suspected conflicting licenses. Each verified license includes a declared license that is verified by a detected license. Each suspected conflicting license includes a declared license that conflicts with a detected license. Determining the first list of verified licenses can include determining, based on license dependency database, that a first declared license requires a second detected license. The system, upon determining that the second detected license is present in the declared licenses or the detected licenses, can designate the first declared license verified.

The system generates (710), based on the first list of verified licenses, the second list of suspected conflicting licenses, and input from a license administrator, a compliance document that specifies the license obligations. The compliance document can be distributed with the software package to ensure compliance. The compliance document includes text specifying terms and conditions on using, copying, distributing or modifying dependencies with verified licenses contained within or included with the software package. The system can provide the compliance document for display, or upload the compliance document to the repository of the software package for storage or distribution.

The system can present the first list and the second list on a dashboard user interface to the license administrator. The dashboard user interface is configured to receive the input. The input can be an input to edit license text.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method comprising
receiving, by a license analyzer including one or more processors, a triggering event for analyzing license obligations associated with a software package;
in response to the triggering event, performing a first scan on dependencies in the software package, the first scan determining libraries included in the software package and declared licenses in the included libraries;
performing a second scan on source files in the software package, the second scan determining, based on license indicators present in the source files, detected licenses in the software package;
performing an evaluation process on pairs of licenses using a database of rules, wherein each rule in the database defines, for each pair of licenses comprising a declared license and a respective detected license, (i) a relationship between the pair of licenses and (ii) a corresponding action that controls whether the pair of licenses is flagged for review or automatically included in a compliance document for the software package whenever the declared license and the detected license have the defined relationship;

determining, from performing the evaluation process on pairs of licenses, a plurality of verified licenses and a plurality of licenses flagged review;

providing one or more of the licenses flagged for review to a license review module; and generating, based on the plurality of verified licenses a compliance document that specifies the license obligations associated with the software package.

2. The method of claim 1, wherein the license indicators include at least one of:

one or more identifiers of licenses; or terms that indicate that copyrighted material is used in the software package.

3. The method of claim 1, wherein the triggering event includes a user request, a scheduled event, or an update to the software package.

4. The method of claim 3, wherein both the first scan and the second scan are incremental according to the update, and wherein the update includes a code push.

5. The method of claim 1, comprising presenting, by the license review module, one or more licenses flagged for review on a dashboard user interface presentation.

6. The method of claim 1, wherein each license is a software use license, or a copyright notice.

7. The method of claim 1, wherein determining the plurality of licenses flagged for review comprises:

determining, from performing the evaluation process on pairs of declared licenses and respective detected licenses using the database of rules, that a first license that is present in the software package requires a second license and that the second license is absent from the declared licenses and from the detected licenses of the software package;

in response, designating the first license as a license flagged for review.

8. The method of claim 5, comprising:

receiving, by the license review module, user input modifying one or more of the licenses flagged for review; and updating the compliance document with the one or more licenses modified by the user input.

9. The method of claim 1, wherein the first and second scans are performed in real time and in association with a code push.

10. The method of claim 1, wherein the first scan is a predictive scan based on a library dependency database.

11. A system comprising:

one or more computers; and one or more storage devices which store instructions that are operable, when executed by the one or more computers, to cause the one or more computers to perform operations comprising:

receiving, by a license analyzer including one or more processors, a triggering event for analyzing license obligations associated with a software package;

in response to the triggering event, performing a first scan on dependencies in the software package, the first scan determining libraries included in the software package and declared licenses in the included libraries;

performing a second scan on source files in the software package, the second scan determining, based on license indicators present in the source files, detected licenses in the software package;

performing an evaluation process on pairs of licenses using a database of rules, wherein each rule in the database defines, for each pair of licenses comprising a declared license and a respective detected license, (i) a relationship between the pair of licenses and (ii) a corresponding action that controls whether the pair of licenses is flagged for review or automatically included in a compliance document for the software package whenever the declared license and the detected license have the defined relationship;

determining, from performing the evaluation process on pairs of licenses, a plurality of verified licenses and a plurality of flagged for review;

providing one or more of the licenses flagged for review to a license review module; and generating, based on the plurality of verified licenses a compliance document that specifies the license obligations associated with the software package.

12. The system of claim 11, wherein the license indicators include at least one of:

one or more identifiers of licenses; or terms that indicate that copyrighted material is used in the software package.

13. The system of claim 11, wherein determining the plurality of licenses flagged for review comprises:

determining, from performing the evaluation process on pairs of declared licenses and respective detected licenses using the database of rules, that a first license that is present in the software package requires a second license and that the second license is absent from the declared licenses and from the detected licenses of the software package;

in response, designating the first license as a license flagged for review.

14. The system of claim 11, wherein the operations comprise:

presenting, by the license review module, one or more licenses flagged for review on a dashboard user interface presentation;

receiving, by the license review module, user input modifying one or more of the licenses flagged for review; and updating the compliance document with the one or more licenses modified by the user input.

15. The system of claim 11, wherein the first scan is a predictive scan based on a library dependency database.

16. One or more non-transitory storage devices storing instructions that are operable, when executed by one or more computers, to cause the one or more computers to perform operations comprising:

receiving, by a license analyzer including one or more processors, a triggering event for analyzing license obligations associated with a software package;

in response to the triggering event, performing a first scan on dependencies in the software package, the first scan determining libraries included in the software package and declared licenses in the included libraries;

performing a second scan on source files in the software package, the second scan determining, based on license indicators present in the source files, detected licenses in the software package;

performing an evaluation process on pairs of licenses using a database of rules, wherein each rule in the database defines, for each pair of licenses comprising a declared license and a respective detected license, (i) a relationship between the pair of licenses and (ii) a corresponding action that controls whether the pair of licenses is flagged for review or automatically included in a compliance document for the software package whenever the declared license and the detected license have the defined relationship;

determining, from performing the evaluation process on pairs of licenses, a plurality of verified licenses and a plurality of licenses flagged for review;

providing one or more of the licenses flagged for review to a license review module; and generating, based on the plurality of verified licenses a compliance document that specifies the license obligations associated with the software package.

17. The one or more non-transitory storage devices of claim 16, wherein the license indicators include at least one of:

one or more identifiers of licenses; or terms that indicate that copyrighted material is used in the software package.

18. The one or more non-transitory storage devices of claim 16, wherein the triggering event includes a user request, a scheduled event, or an update to the software package.

19. The one or more non-transitory storage devices of claim 18, wherein both the first scan and the second scan are incremental according to the update, and wherein the update includes a code push.

20. The one or more non-transitory storage devices of claim 16, the operations comprising presenting, by the license review module, one or more licenses flagged for review on a dashboard user interface presentation.

* * * * *